Feb. 6, 1923.
W. L. CODNER.
MINNOW PAIL.
FILED JAN. 26, 1922.
1,444,412.
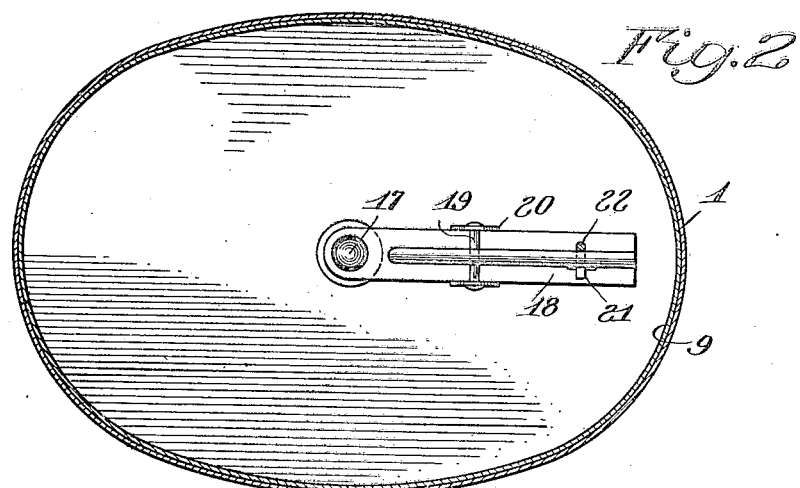
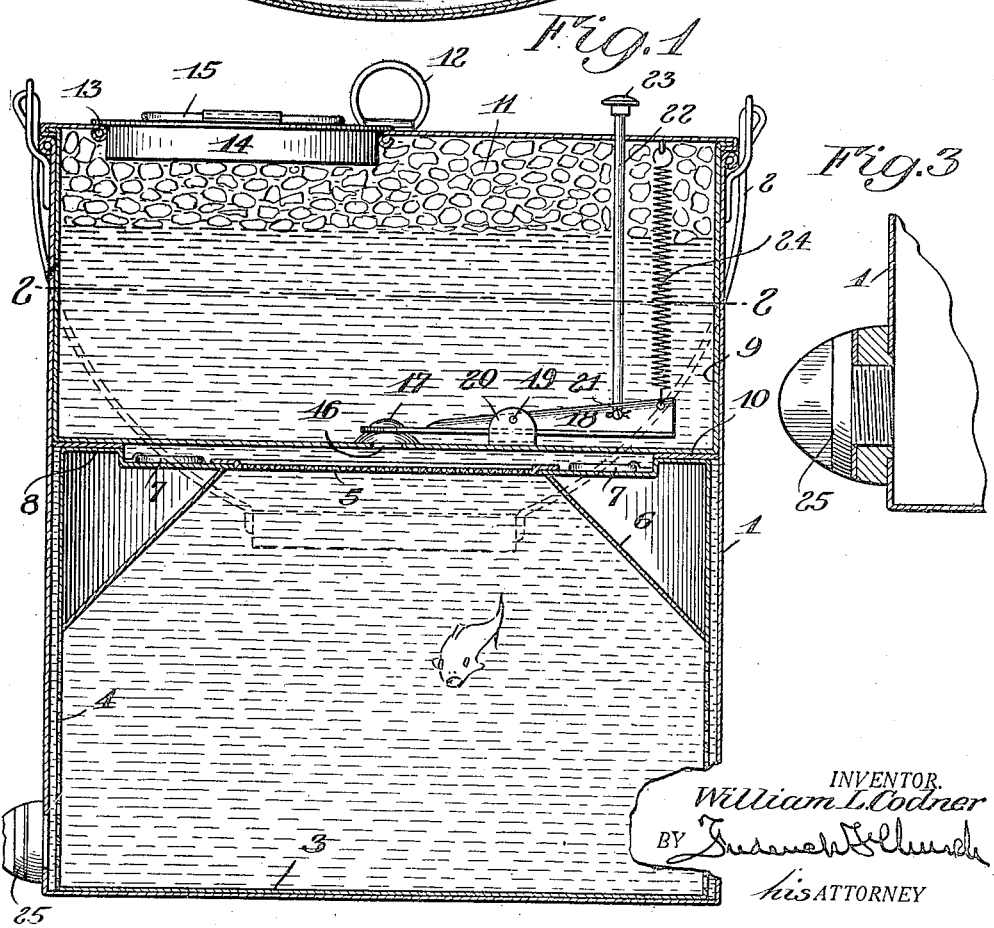
INVENTOR.
William L. Codner
BY
his ATTORNEY Patented Feb. 6, 1923.

1,444,412

UNITED STATES PATENT OFFICE.

WILLIAM L. CODNER, OF ROCHESTER, NEW YORK.

MINNOW PAIL.

Application filed January 26, 1922. Serial No. 531,978.

*To all whom it may concern:*

Be it known that I, WILLIAM L. CODNER, of Rochester, in the county of Monroe and State of New York, have invented certain new and useful Improvements in Minnow Pails; and I do hereby declare the following to be a full, clear, and exact description of the same, reference being had to the accompanying drawings, forming a part of this specification, and to the reference numerals marked thereon.

My present invention relates to sporting goods, and more particularly to apparatus for transporting and preserving live bait, and it has for its object to provide a simple, cheap and convenient minnow pail that will offer increased advantages for preserving the contained fish for longer periods than heretofore with the same supply of water. The improvements include provision for the carrying of a reserve supply of water or ice that may be used as required and are directed in part toward means for controlling the feed of this supply into the body of water in which the fish are confined. To these and other ends the invention consists in certain improvements and combinations of parts, all as will be hereinafter more fully described, the novel features being pointed out in the claims at the end of the specification.

In the drawings:

Figure 1 is a vertical sectional view through a minnow pail constructed in accordance with and illustrating one embodiment of my invention;

Figure 2 is a horizontal section therethrough on the line 2—2 of Figure 1, and

Figure 3 is an enlarged detailed sectional view through the drain pipe.

Similar reference numerals throughout the several views indicate the same parts.

I have discovered in connection with transporting minnows or similar small bait fish that the fish weaken and die in most cases more as a result of bruises and exertion than as a result of the staleness of the water depriving them of sufficient oxygen. This is because, in the ordinary pail, the water in which they are swimming is permitting to wash and flow about thereby frequently throwing the fish violently against the walls of the container and against each other. On the other hand if the fish are confined in a solid body of water that is not permitted movement they can maintain their equilibrium and the safety of their position in most any position of the container. It is on this latter principle with certain additions in the way of also providing a reserve body of fresh water that I have constructed my pail.

Referring more particularly to the drawing, 1 indicates the usual outer container or pail proper which is of cylindrical or oval shape and provided with a handle 2. Within the lower portion of this outer container and fitting it fairly snugly is an inner container 3 in which the fish or bait are confined and which has foraminous side walls 4 and a similarly perforated top or lid 5 which may be opened to insert or withdraw the minnows. The upper corners of the inner container may be partitioned off as usual at 6 to provide an annular float chamber or air space that causes the inner container to float when removed from the pail and hung over the side of the boat. The central portion of the top of the inner container is preferably depressed as shown not only to give clearance for the lid 5 and a pair of lifting rings 7 but to furnish a raised marginal seat 8 upon which an overlying reservoir 9 rests.

This reservoir 9 occupies the remainder of the interior of the pail which it fits very snugly resting on the container 3 through the medium of a felt, rubber or similar gasket 10 arranged between it and the seat 8 so that it will be difficult for any appreciable amount of the body of water in the inner container 3 from working up along the walls of the outer container past the reservoir. The latter preferably contains a body of cracked ice indicated at 11, or a mixture of cracked ice and water. Its top is closed being provided with a central ring 12 by means of which it may be lifted out and also with an opening 13 through which it is filled, said opening being normally closed by a lid or stopper 14 having a handle 15.

In the bottom of the reservoir 9 is an opening 16 communicating with the depressed portion of the inner container opposite the perforated lid 5, and this opening is normally closed by a valve member 17 carried on a horizontal arm 18 pivoted at 19 to a bracket 20 extending up from the bottom of the reservoir. On the opposite side of the pivot 19 there is pivoted to the arm 18 at 21 a vertical push rod 22 that extends upwardly through the top of the reservoir and terminates in an exterior button 23. A spring 24 connected to the top of the reservoir and to the arm 18 holds the valve 16 normally closed, but it may be opened by downward pressure on the push rod.

In preparing the pail for use it is half filled with water sufficiently to submerge the inner container 3 and the fish or bait are introduced therein through the lid 5. The reservoir 9 is then placed in position to overlie the inner receptacle and force it to the bottom of the pail. This produces a solid body of water within the inner receptacle in which the fish is suspended and a separate body of water in the reservoir 9 that is shut off therefrom, the reservoir having been previously filled. The object is to eliminate any air space between the lower inner receptacle and the reservoir, and if any air may have been trapped therein the valve 17 is opened until such air is driven out or expressed and its place taken by water from the reservoir. The valve 17 is then closed. It will thus be seen that the water in which the fish are present cannot slop about but is held solidly in all positions of the pail so that the fish can handle themselves and are not dashed about against the side walls. They are not bruised or exhausted in their efforts to accommodate themselves to the wash of the water and will live much longer.

When it is desired to freshen or renew the water in the inner container, a suitable plug 25 in or near the bottom of the pail 1 is removed and a part at least of the water drained out. Upon replacing the plug the valve 17 is opened which fills the inner container from the reservoir 9 with cold fresh water in the same manner as before and with all the air driven out as before, care of course being exercised that no more water than can be replaced from the reservoir be withdrawn from the lower portion of the pail.

I claim as my invention:

1. In a minnow pail, the combination with an outer container, an inner container arranged therein and adapted to be submerged in water, a sealing device for the top of the inner container, and means for expressing all air from the latter so that it confines a solid body of water.

2. In a minnow pail, the combination with an outer container, an inner container arranged therein and adapted to be submerged in water, a sealing device for the top of the inner container, and means for introducing water into the inner container until all air has been expressed therefrom and then sealing the same.

3. In a minnow pail, the combination with an outer container, an inner container arranged in the lower portion thereof to be submerged in water and having an opening at its top, a reservoir overlying the inner container to seal the top thereof and having an opening in its bottom, and a valve controlling said opening.

4. In a minnow pail, the combination with an outer container, an inner container arranged in the lower portion thereof to be submerged in water and having an opening at its top, a reservoir overlying the inner container to seal the top thereof and having an opening in its bottom, a valve controlling said opening and an operating member for the valve accessible from the exterior of the reservoir and outer container.

5. In a minnow pail, the combination with an outer container, an inner container arranged in the lower portion thereof to be submerged in water and having an opening at its top, a reservoir overlying the inner container to seal the top thereof and having an opening in its bottom, a valve controlling said opening and comprising a horizontal pivoted arm, a spring normally holding said valve closed and an exteriorly operable push rod connected to the arm to open the valve.

6. In a minnow pail, the combination with a water container, of means for sealing the top thereof and means for expressing all air from the container after said seal has been applied.

WILLIAM L. CODNER.